United States Patent [19]

Hinshaw

[11] 4,188,994
[45] Feb. 19, 1980

[54] COOLING AND HEATING APPARATUSES

[76] Inventor: Louis W. Hinshaw, Box 111, Hays, Kans. 67601

[21] Appl. No.: 714,914

[22] Filed: Aug. 16, 1976

[51] Int. Cl.² ............................................. F28B 29/00
[52] U.S. Cl. ......................................... 165/61; 62/304; 62/426; 126/417; 165/137; 261/106; 261/152
[58] Field of Search ...................... 165/137, 60, 48, 61; 126/270; 261/106, 152, 153; 62/426, 326, 310, 304

[56] References Cited

U.S. PATENT DOCUMENTS

| 1,074,219 | 9/1913 | Skiff | 126/270 |
|---|---|---|---|
| 1,848,996 | 3/1932 | Dawson | 62/426 X |
| 2,196,310 | 4/1940 | Kalin | 62/426 X |
| 2,780,073 | 2/1957 | Curry | 62/426 X |
| 3,864,442 | 2/1975 | Percy | 261/152 X |
| 3,957,109 | 5/1976 | Worthington | 165/48 |
| 4,045,523 | 8/1977 | Goettl | 261/106 X |

Primary Examiner—Albert W. Davis, Jr.
Attorney, Agent, or Firm—Robert E. Breidenthal

[57] ABSTRACT

A cooling apparatus, having an evaporative cooler interfaced with an insulated air chamber and detachable therefrom to be replaced with a solar heater collecting panel, said insulated air chamber being connected to a house or other structure by air passage means and said evaporative cooler operable by other than the conventional electrical energy sources as well as the usual electrical energy source, said assembly to be used for the cooling and heating of houses and other structures.

7 Claims, 2 Drawing Figures

U.S. Patent  Feb. 19, 1980  4,188,994
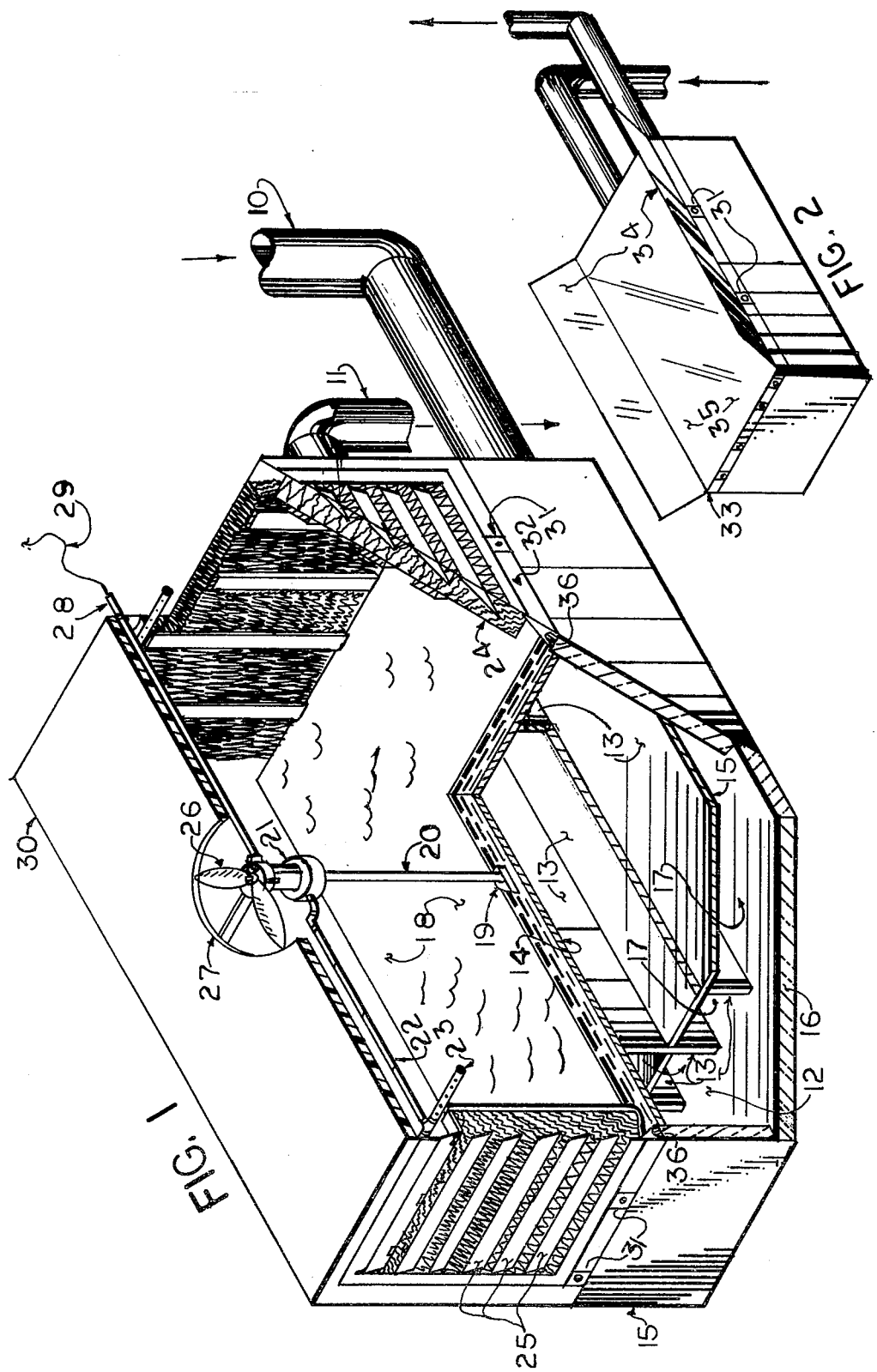

COOLING AND HEATING APPARATUSES

FIELD OF THE INVENTION

This invention is in the field of cooling apparatus for air, utilizing evaporative cooling and exhausting the evaporated moisture into the atmosphere rather than into the building to be cooled; this invention is also in the field of solar heaters and heater-cooler combination.

DESCRIPTION OF THE PRIOR ART

In the prior art, the engineering and inventive philosophy has leaned toward effectiveness at any cost and has tended away from the less effective, more economical evaporative coolers and toward more effective, more expensive compressed gas refrigerant systems for air cooling. We know of no prior invention that uses a dry-air interface such as this to directly cool air in this fashion. Moreover, no solar heating system of which we are cognisant is useable all year round. One of the chief objectives of this invention is to provide an alternate-energy system which will be in service most of the year and will not depend on conventional sources of energy and will save money.

SUMMARY OF THE INVENTION

An apparatus for cooling and heating air for use in a house or other structure at a maximum BTU per cost efficiency, and being a solar heater comprising an insulated box pierced for air passage means and connectable for air passage to a house or other structure and disposing a detachable frame comprising a framework, a solar collector panel, and weatherproofing means, and containing a series of baffles, and having a detachable evaporative cooler comprising a water resevoir, water distribution means which feed water to wicks through which air is drawn by a fan and exhausted into the atmosphere, and disposing a metal plate on one face of said evaporative cooler to serve as an interface between said evaporative cooler and the body of said insulated box when the solar panel has been detached. Moving parts of this cooling assembly, i.e. a pump and a fan, are to be motivated by a windmill, for example, so as to allow the entire system to be free of need for conventional energy sources, if so desired. It is a cooler in the summer and a heater in the winter, thus defined which is the main objective of this invention to provide.

Another object of this invention is to provide a low-cost solar heater which will save fuel costs for its user. Still another object of this invention is to provide a means of cooling and dehumidifying air in the summer while saving much of the costs of electrical air-conditioning. A further object is to provide a cooling apparatus as described which has a series of baffles disposed in the body of the solar heater to which it is detachably attached, said series of baffles forming in addition to their primary purpose of directing the flow of air an additional mechanical support for the metal interface of the cooler. A still further object is to provide an evaporative cooler as described which can be driven by mechanical means so as to permit use of any available sources of energy which can be attached thereunto.

DESCRIPTION OF THE DRAWINGS

FIG. 1. A view of the cooling apparatus interfaced with an insulated air chamber, said chamber disposing a baffles plate which directs air flow and helps support the detachable cooling apparatus.

FIG. 2. A view of the air chamber closed with a solar heater collector panel and disposing reflectors for use in the heating mode.

DESCRIPTION OF THE PREFERRED EMBODIMENT

In FIG. 1 we see a general view of the cooling apparatus 30 with air influx 10 and exhaust 11 leading to chamber 12 where the air flowing in flows down the side of the baffles 13 nearest the metal interfacing partition 14. Said baffles 13 are snug at two opposing sides 15 of the chamber 12. The air chamber 12 is insulated 16 on all faces except the interface 14. At the end of the baffles 13 farthest from the air passages 10,11, the air flows downwardly and around the end of the baffles 13 as per the arrows 17. The air then flows back along the bottom of the chamber 12 to exhaust 11 into a house or other structure.

In FIG. 2, we see the air chamber 12 of FIG. 1 employed as a solar heater. Here we see that the air flow is exactly opposite, with the influx at 11 and the exhaust at 10. This is because the system is designed to use convection as an air motive means where possible, and the tubes turning upwardly 10 and downwardly 11 is to promote this convection. In the cooling mode, air will flow out the downwardly turned tube 11, and in the heating mode, air will flow out through the upwardly turned tube 10.

In FIG. 1, we see a more or less standard evaporative cooler 30 affixed to an air chamber 12 designed to encourage this convection flow. Water 18 is drawn in through a foot valve 19 from a water storage tank 32 situate, for example, in the base of the cooling apparatus 30. Said water 18 is further drawn through a tube 20 to a pump 21 whence it flows through a pipe 22 to distribution sprinklers 23 and is dropped onto wicks 24. Louvres 25 in the sides of the cooler 30 permit air to be drawn in through the wet wicks 24 by fan 26 and exhausted into the atmosphere through fan port 27.

At the right end of the cooling apparatus 30 we see a shaft housing 28 protruding from the case 30 and containing a flexible shaft 29 which can be powered by a windmill, water mill, electric motor, photovoltaic cell, or, if desired, a hand crank.

Not shown on this drawing is a condensate drain which will certainly be necessary to the air chamber 12 when used in the cooling mode. As the warm air flows in and its temperature drops, moisture will condense and run off the baffles 13 and the back of the interface 14 into the bottom of the chamber 12. This will cause the cooling system to dehumidify the air as well as to cool it. The drain for the air chamber 12 may be fixed so as to allow the condensate to drain into a water reservoir, not shown, external to the cooling apparatus 30, thus conserving water and permitting longer periods between the times when the reservoir 32 needs to be refilled from a source of supply.

The latches 31 attaching the cooling apparatus 30 to the air chamber 12 may be as complex or as simple as desired. When the system is needed in the cooling mode, the cooling apparatus 30 is attached to the air chamber 12 with a weather-tight seal 36. The baffles 13 will reinforce the interface 14 in support of the water 18 used in the cooling mode. When the warm season of the year is over, the cooler 30, with the interface 14, may be detached and stored out of the weather if desired.

When the weather is cold, a frame 33, using the same latching system 31, may be placed on the air chamber 12 to collect radiant heat and keep out the weather. This frame 33 will include a transparent or translucent panel 35 which will admit radiant heat which can be absorbed and converted into sensible heat by the baffles 13. For maximum effect, one or more mirrors or reflectors 34 should be positioned to focus additional radiant energy onto the collecter panel 35 as per FIG. 2. These reflecters 34 may include lid capabilities with insulation.

The terminus of the upwardly turning tube 10 and the downwardly turning tube 11 should be closed off in the winter whenever the sun is not shining on the collecter panel 35 to prevent heat loss from the house or other structure.

The apparatus may be built in any desired shape or size. The depth of the air chamber 12 should be on the order of a foot or more, and the baffles 13 should be situated approximately midway between back of the chamber 12 and the interface 14. The apparatus may be installed either horizontally or vertically and may rest on the ground or on a frame off the ground or be affixed to the side of a building, either in a frame or mounted flush to the wall, with air passages 10,11, pierced directly through the wall.

This heating and cooling system is not designed to be tied into a central system as that would impair its effectiveness. It is meant to be so installed as to heat or cool a defined space, as a room or group of rooms. The individual apparatuses may be ganged or installed at intervals around a building or whatever combination is desired. It will act as a complement to systems already in use, and, by adding whatever amount of heated or cooled air, reduce the overall conventional energy needs of the building on or at which it is installed. A properly installed system of this sort will, we believe, so reduce costs as to amortize itself in three years or less, and, in common use, will much reduce the energy burden with which we are faced at this time.

Because this system is simple and uses standard principles as its components, installation and maintenance should be easy and it should have a long service life. It may be manufactured locally in small shops if desired, and at a low enough cost as to be within the reach of many citizens now not able to afford the installation and upkeep of conventional systems for central heat and air conditioning now in use.

I claim:

1. Air conditioning apparatus comprising an open-topped heat exchange housing formed of walls of heat insulating character, interchangeable means selectively positionable atop the housing for respectively admitting and withdrawing energy from the interior of the housing through the top of the latter, each of said interchangeable means including a horizontal wall disposed to close the open top of the housing when positioned atop the housing, with each of said interchangeable means also including means engageable with coacting means carried by the housing for detachably securing such means to the housing, said housing including a side wall having upper and lower openings therethrough, whereby air can be introduced and removed from the interior of the housing, baffle means within the housing for defining jointly with the horizontal wall of the interchangeable means positioned atop the housing an air path between said openings within the housing that extends horizontally from the upper opening along the underside of the horizontal wall to a second side wall of the housing opposite said side wall, thence downwardly along said second side wall, and finally horizontally to the lower opening.

2. The combination of claim 1, including a first air conduit disposed externally of the housing and sealingly connected to the side wall about the periphery of the upper opening, a second air conduit disposed externally of the housing and sealingly connected to the side wall about the periphery of the lower opening, said first and second conduits respectively extending to positions above and below the housing, whereby air flow through the housing is connectively induced.

3. The combination of claim 1, wherein one of the interchangeable means is an evaporative cooler wherein the horizontal wall thereof is substantially flat, coextensive with the open top of the housing and of a heat conductive material, said evaporative cooler including water containing means that is constituted in part by the horizontal wall forming the bottom thereof, said evaporative cooler including means for removing water from the water containing means and thence returning the same along a path affording evaporative contact with ambient air, whereby cool water is maintained on the top of the heat conductive wall.

4. The combination of claim 3, wherein the baffle means includes a horizontal plate and a plurality of vertical plates extending above and below the horizontal plate, said vertical plates having substantially coplanar upper edges engaged by the horizontal wall, whereby the baffle means lends support to the water containing means.

5. The combination of claim 4, wherein said vertical baffle plates are of heat conductive material, whereby the engagement of the vertical baffle plates contribute to the thermal coupling and heat exchange efficiency between the contained water and air flowing through the housing.

6. The combination of claim 1, wherein the horizontal wall of one of the interchangeable means is substantially transparent to solar radiation, and wherein the baffle means are absorptive of solar radiation to convert the latter to sensible heat.

7. The combination of claim 6, together with means for reflecting solar radiation toward the horizontal wall.

* * * * *